(12) United States Patent
Kim et al.

(10) Patent No.: US 10,675,849 B2
(45) Date of Patent: Jun. 9, 2020

(54) LAMINATING APPARATUS AND MANUFACTURING METHOD OF DISPLAY DEVICE

(71) Applicant: SAMSUNG DISPLAY CO., LTD., Yongin-si, Gyeonggi-do (KR)

(72) Inventors: So Hyun Kim, Cheonan-si (KR); Yang Han Son, Cheonan-si (KR); Sang Hee Choi, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 93 days.

(21) Appl. No.: 15/678,558

(22) Filed: Aug. 16, 2017

(65) Prior Publication Data

US 2018/0134022 A1 May 17, 2018

(30) Foreign Application Priority Data

Nov. 17, 2016 (KR) .......................... 10-2016-0153613

(51) Int. Cl.
| | | |
|---|---|---|
| B32B 37/00 | (2006.01) | |
| B32B 38/00 | (2006.01) | |
| H05K 5/00 | (2006.01) | |
| B32B 37/10 | (2006.01) | |
| B32B 38/18 | (2006.01) | |
| B29C 63/04 | (2006.01) | |
| B29C 70/28 | (2006.01) | |

(52) U.S. Cl.
CPC .............. *B32B 37/10* (2013.01); *B32B 38/18* (2013.01); *B32B 38/1866* (2013.01); *H05K 5/0017* (2013.01); *B29C 63/04* (2013.01); *B29C 70/28* (2013.01); *B32B 2457/20* (2013.01); *B32B 2457/202* (2013.01); *Y10T 156/1028* (2015.01)

(58) Field of Classification Search
None
See application file for complete search history.

(56) References Cited

U.S. PATENT DOCUMENTS 9,498,938 B2  11/2016  Son et al.

FOREIGN PATENT DOCUMENTS

| KR | 10-2014-0139361 A | 12/2014 |
|---|---|---|
| KR | 10-2015-0029605 | 3/2015 |
| KR | 10-2015-0077829 A | 7/2015 |
| KR | 10-2015-0116023 | 10/2015 |
| KR | 10-1578442 | 12/2015 |
| KR | 10-2016-0102767 A | 8/2016 |
| KR | 10-1653597 B1 | 9/2016 |

OTHER PUBLICATIONS

Chinese Office Action for the corresponding Chinese Patent Application No. 201711143839.0 dated Aug. 15, 2019.

*Primary Examiner* — Linda L Gray
(74) *Attorney, Agent, or Firm* — Kile Park Reed & Houtteman PLLC

(57) ABSTRACT

A method of laminating includes a step of preparing each of a first jig to fix a window, and a second jig including a shape pad, in which the second jig faces the first jig, and the shape pad includes each of a top surface protruding toward the first jig, sides surrounding the top surface, and at least one incision pattern, which is inwardly recessed from at least one of the sides of the shape pad and extends toward the first jig. The method further includes a step of bonding the window and the panel by applying pressure to the panel with the shape pad.

13 Claims, 19 Drawing Sheets

LAMINATING APPARATUS AND MANUFACTURING METHOD OF DISPLAY DEVICE

CROSS-REFERENCE TO RELATED APPLICATION

Korean Patent Application No. 10-2016-0153613, filed on Nov. 17, 2016, in the Korean Intellectual Property Office, and entitled: "Laminating Apparatus and Manufacturing Method of Display Device," is incorporated by reference herein in its entirety.

BACKGROUND

1. Field

The present disclosure relates to a laminating apparatus and a manufacturing method of a display device using the same.

2. Description of the Related Art

A flexible display device having a flexible substrate that is light in weight, robust against shock, and formed of, e.g., a plastic material, has been developed. The flexible display device is foldable or rollable, is easy to carry around, and can thus be applied in various fields.

The flexible display device includes a display device formed on a flexible substrate. Examples of the display device include an organic light-emitting display device, a liquid crystal display (LCD) device, and the like.

These types of display devices generally include thin-film transistors (TFTs). Thus, the flexible substrate is inevitably subjected to several thin-film processes. Once the thin-film processes are complete, the flexible substrate is encapsulated by an encapsulation layer. The flexible substrate, the TFTs formed on the flexible substrate, and the encapsulation layer form a display panel of a display device together.

In general, a cover window is attached onto the front of the display panel to protect the display panel. A binder is inserted between the display panel and the cover window, and thus, the display panel and the cover window are bonded together.

A side-view display device, including a main display area in which a main image is displayed and an auxiliary display area which is provided on a side of the display device that is bent and in which a sub-image is displayed, has been developed. The cover window of the side-view display device has a bent structure on a side thereof.

SUMMARY

According to an exemplary embodiment of the present disclosure, a laminating apparatus includes a first jig fixing a window and a second including a shape pad, which faces the first jig, wherein the shape pad includes a top surface, which protrudes toward the first jig, sides, which surround the top surface, and at least one incision pattern, which is inwardly recessed from one of the sides of the shape pad and extends toward the first jig.

The sides of the shape pad may include long sides and short sides, and the at least one incision pattern may be formed on one of the short sides.

The short sides may include first and second short sides, which are opposite to each other, the at least one incision pattern may include first and second incision patterns, and the first and second incision patterns may be formed on the first and second short sides, respectively.

The at least one incision pattern may include first and second incision patterns, and the first and second incision patterns may be formed on one of the short sides and one of the long sides, respectively.

The at least one incision pattern may extend to connect a top and a bottom of the short side where it is formed.

The incision pattern may at least partially penetrate one of the short sides to form a stepped portion on the corresponding short side.

A planar shape of the at least one incision pattern may be at least partially curved.

A planar shape of the incision pattern may be rectangular.

A planar shape of the incision pattern may be triangular.

The window may include a flat surface and curved surfaces, which are disposed on both sides of the flat surface.

The laminating apparatus may include a panel disposed between the shape pad and the first jig.

The laminating apparatus may include panel supports disposed on both sides of the panel.

The panel supports may bend the panel by inwardly pushing both ends of the panel PA.

The second jig may further include a stage, on which the shape pad is disposed, and a dam, which is disposed adjacent to one of the sides of the shape pad.

The sides of the shape pad may include long sides and short sides, and the dam may be disposed adjacent to one of the short sides.

The laminating apparatus may further include a driver circuit disposed on a side of the panel, wherein the at least one incision pattern is disposed adjacent to the driver circuit.

According to an exemplary embodiment of the present disclosure, a method of fabricating a display device includes preparing a first jig, which fixes a window, a second jig, which includes a shape pad that faces the first jig, and a panel, which is disposed on the second jig, and gradually bonding the window and the panel by applying pressure to the panel with the shape pad, wherein the shape pad includes a top surface, which protrudes toward the first jig, sides, which surround the top surface, and at least one incision pattern, which is inwardly recessed from one of the sides of the shape pad and extends toward the first jig.

A driver circuit may be disposed on a side of the panel, and the method may further include applying, by the shape pad, a relatively low pressure to an area where the driver circuit is disposed and a relatively high pressure to an area around the driver circuit.

The sides of the shape pad may include long sides and short sides, and the at least one incision pattern may be formed on one of the short sides.

The at least one incision pattern may extend to connect a top and a bottom of the short side where it is formed.

The shape pad may further include a stage, on which the shape pad is disposed, and a dam, which is disposed adjacent to one of the sides of the shape pad.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
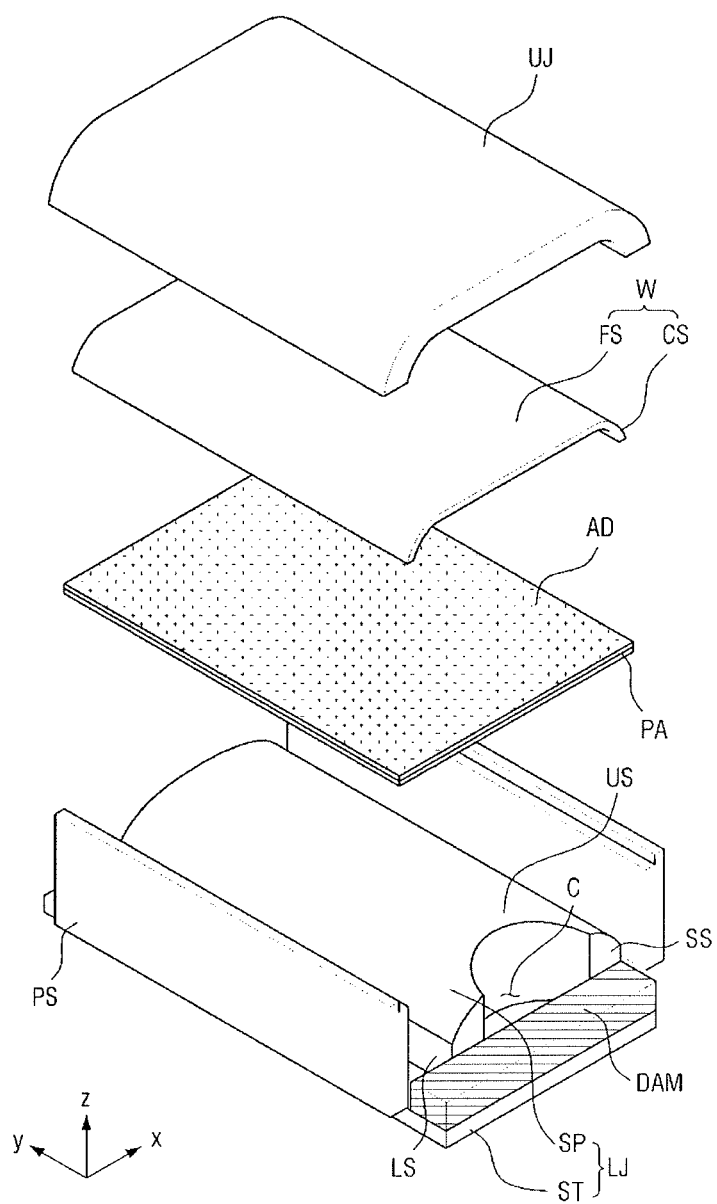
FIG. 1 illustrates a perspective exploded view of a laminating apparatus according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described with reference to the attached drawings.

Figure 2:
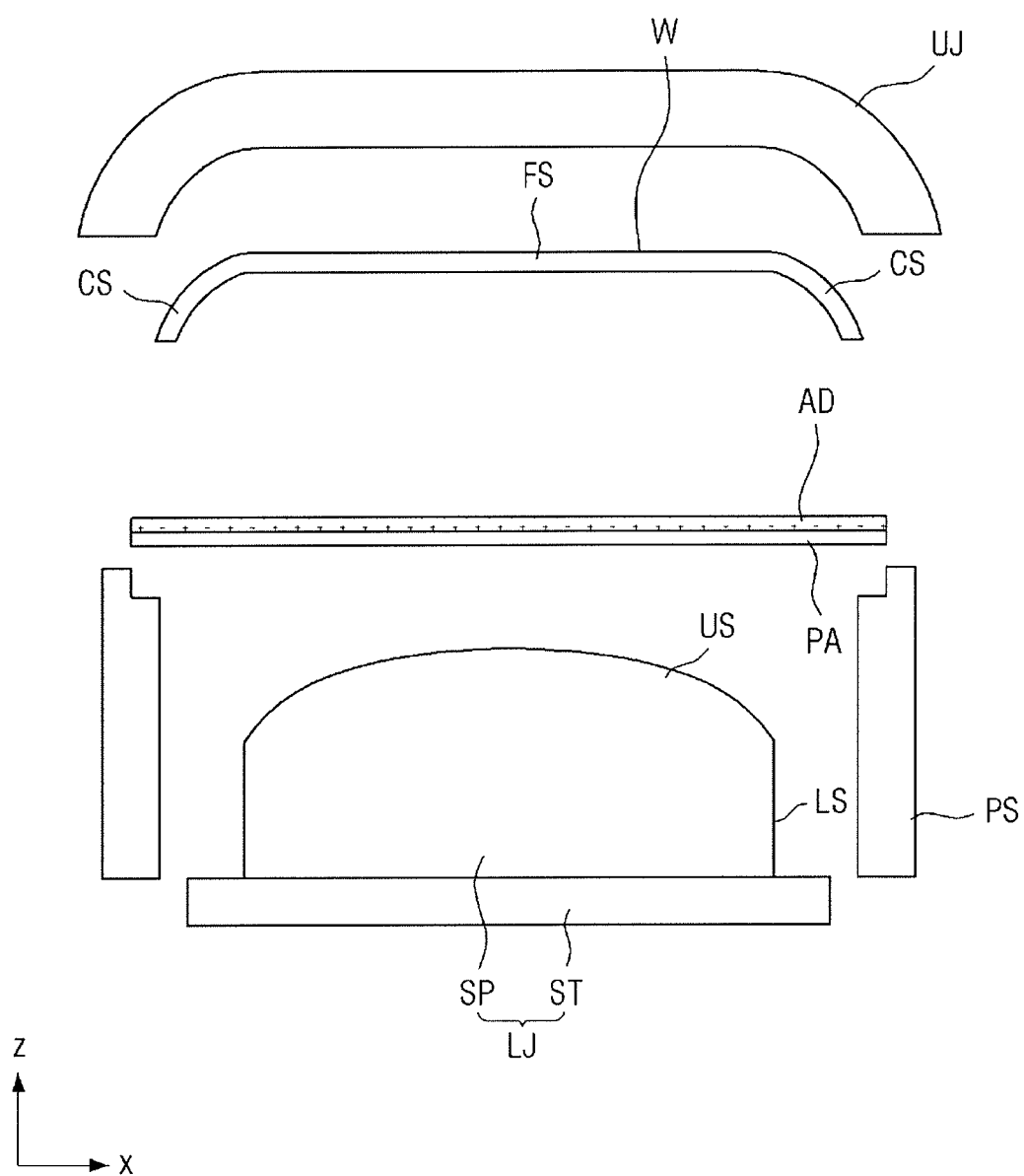
FIG. 2 illustrates a cross-sectional view of the laminating apparatus in FIG. 1.
Figure 3:
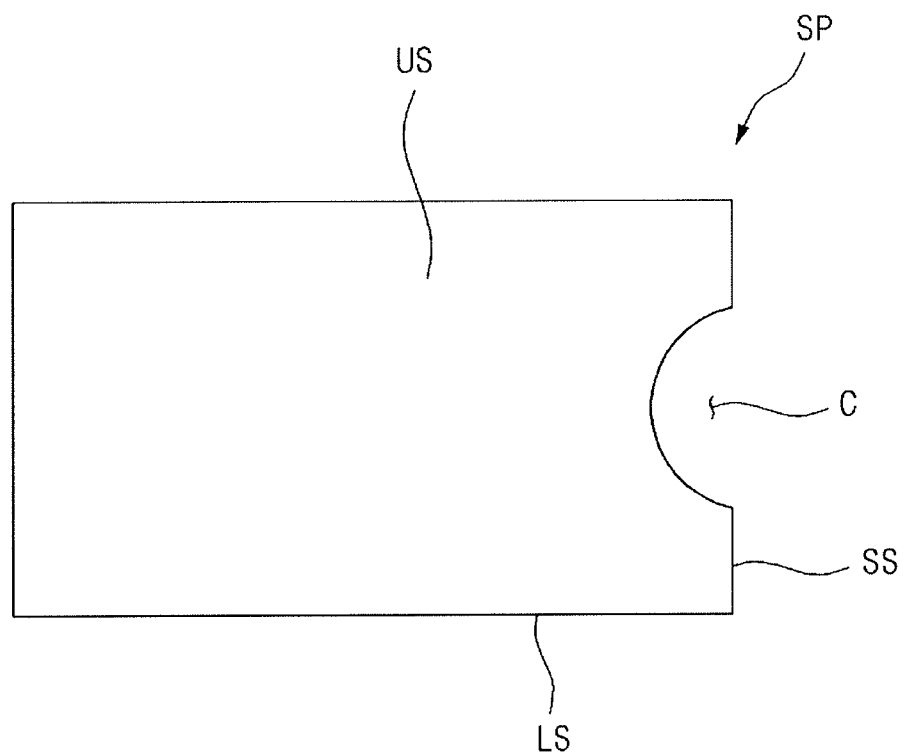
FIG. 3 illustrates a partial plan view of a shape pad in the laminating apparatus in FIG. 1.
Figure 4:
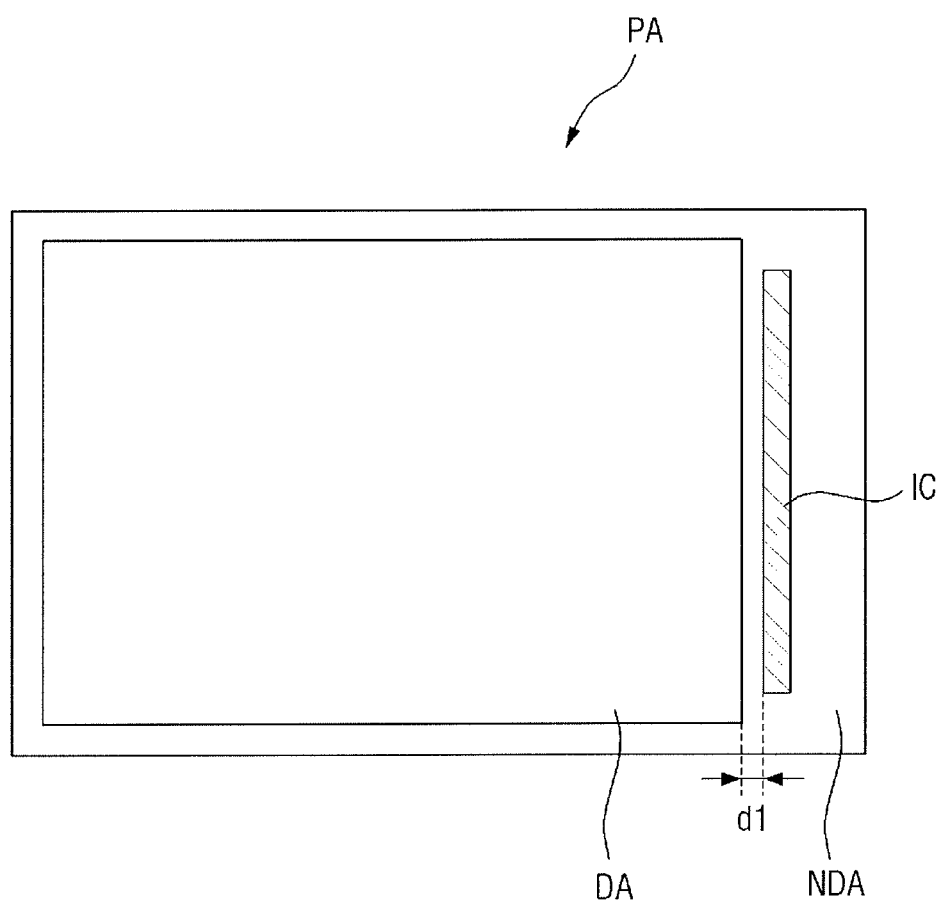
FIG. 4 illustrates a partial plan view of a panel in the laminating apparatus in FIG. 1.
Figure 5:
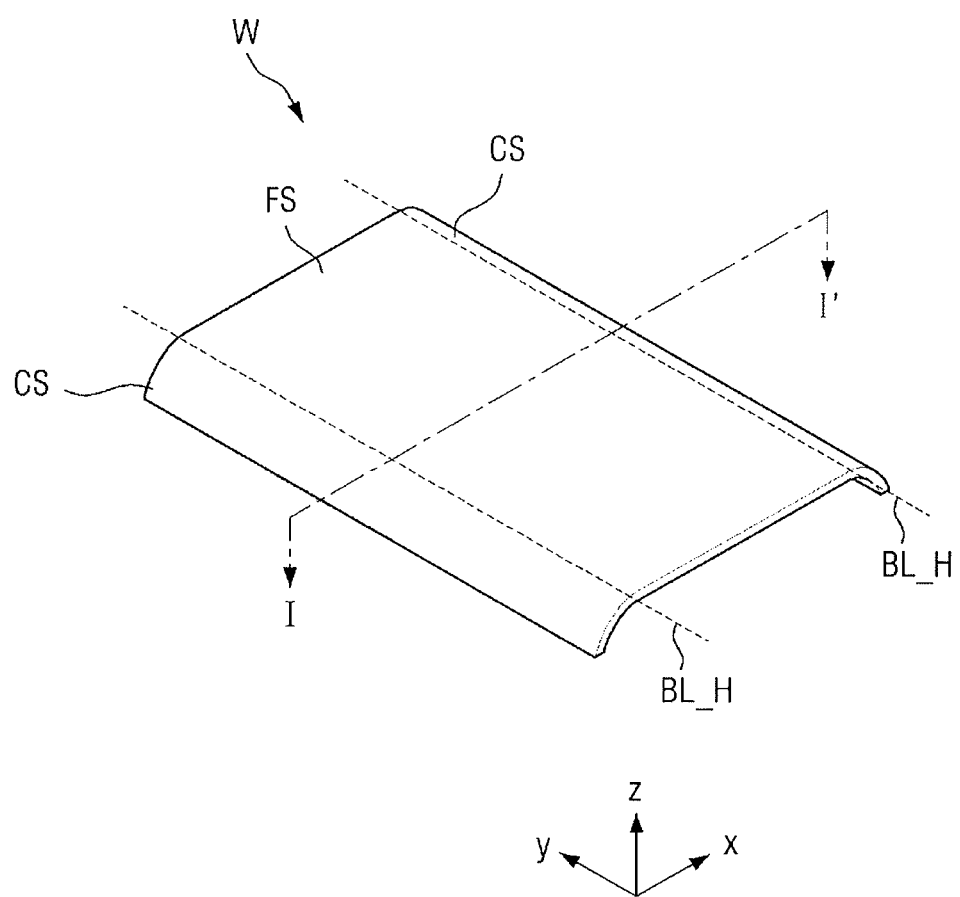
FIG. 5 illustrates a partial perspective view of a window in the laminating apparatus in FIG. 1.
Figure 6:
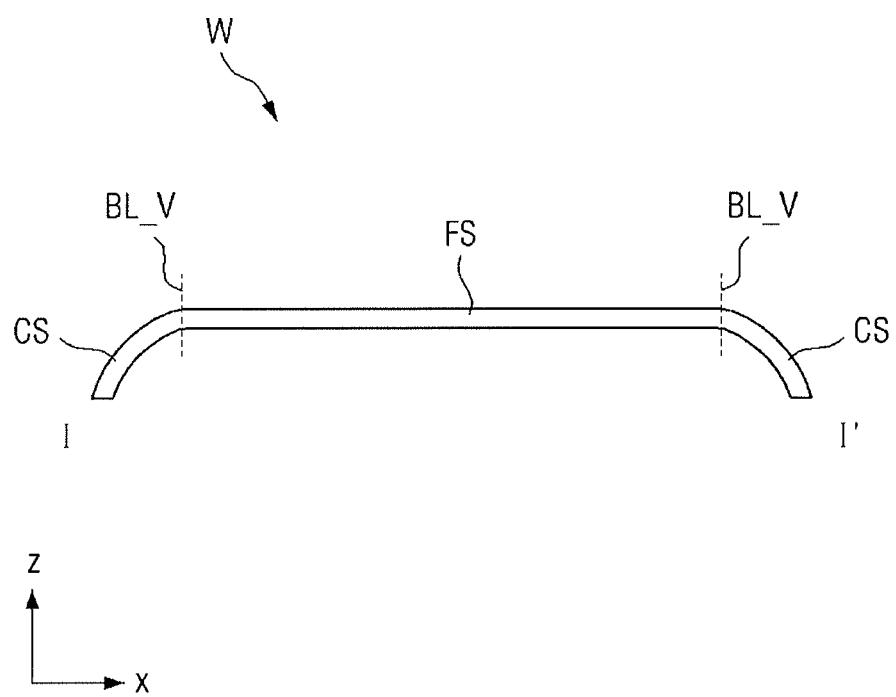
FIG. 6 illustrates a cross-sectional view taken along line I-I' of FIG. 5.

FIG. 1 is a perspective, exploded view of a laminating apparatus according to an exemplary embodiment of the present disclosure. FIG. 2 is a cross-sectional view of the laminating apparatus in FIG. 1. FIG. 3 is a partial plan view of a shape pad in the laminating apparatus in FIG. 1. FIG. 4 is a partial plan view of a panel in the laminating apparatus in FIG. 1. FIG. 5 is a partial perspective view of a window in the laminating apparatus in FIG. 1. FIG. 6 is a cross-sectional view taken along line I-I' of FIG. 5.

Referring to FIGS. 1 through 6, a laminating apparatus according to the present exemplary embodiment may include a first jig UJ, which fixes a window W, and a second jig LJ, which includes a shape pad SP that faces the first jig UJ.

Referring to FIGS. 1 and 2, the first jig UJ may fix the window W. For example, the first jig UJ may fix the window W using a vacuum lift or bonding method. A part of the first jig UJ that is placed in contact with the window W may have a shape corresponding to, e.g., complementary with, the window W. For example, in a case in which the window W has a flat surface and curved surfaces, the first jig UJ may include a flat portion and curved portions accordingly. More specifically, in an example in which the window W has a flat surface FS and curved surfaces CS on both, e.g., opposite, sides of the flat surface FS, the first jig UJ may include a flat portion and curved portions to conform to the shape of the window W.

For example, the first jig UJ may be vertically movable. In other words, the first jig UJ may move in a positive Z-axis direction or a negative Z-axis direction.

The window W may be formed of transparent glass or plastic. In other words, the window W may be formed of a light-transmissive material.

For example, the window may be flexible. In other words, the window W may be formed of a bendable, foldable, or rollable material, and may thus be bendable, foldable, or rollable.

For example, the top surface of the window W may be placed in contact with the first jig UJ and may thus be fixed to the first jig UJ. The window W may have the curved surfaces CS, at least in parts thereof. The window W will be described later in detail with reference to FIGS. 5 and 6.

The second jig LJ may be disposed to face the first jig UJ. For example, the second jig LJ may be a bottom jig disposed below the first jig UJ. For convenience, an example in which the first and second jigs UJ and LJ are disposed at the top and the bottom, respectively, of the laminating apparatus according to the present exemplary embodiment will hereinafter be described, but the present disclosure is not limited to this example. That is, in another example, the first and second jigs UJ and LJ may be disposed at the bottom and the top, respectively, of the laminating apparatus according to the present exemplary embodiment. The second jig UJ may include a stage ST and the shape pad SP, which is disposed on the stage ST.

The stage ST may provide room for the shape pad SP. The stage ST may be vertically movable. For example, the stage ST may move in the positive Z-axis direction or the negative Z-axis direction. Since the stage ST is vertically movable, the shape pad SP may also be vertically movable.

As mentioned above, the shape pad SP may be disposed on the stage ST. For example, the shape pad SP may be coupled to the stage ST. In another example, the shape pad SP may be formed in one integral body with the stage ST.

The shape pad SP may be elastic and may be at least partially deformable. In other words, the shape pad SP may be formed of an elastic material. For example, the shape pad SP may include at least one of urethane, rubber, and a synthetic resin, but the material of the shape pad SP is not particularly limited. That is, any elastic material may be used as the material of the shape pad SP.

For example, the shape pad SP may be formed in one piece. In other words, the shape pad SP may be formed of a single material.

For example, the density of the shape pad SP may be uniform throughout the entire shape pad SP. In other words, the mass of an elastic material per unit volume of the shape pad SP may be the same on the inside and the outside of the shape pad SP, or from one part to another part of the shape pad SP. In a case in which the density of the shape pad SP is uniform throughout the entire shape pad SP, the magnitude of pressure applied by the shape pad SP may be determined only by the shape of the shape pad SP. The shape of the shape pad SP and the pattern of pressure applied by the shape pad SP will be described later with reference to FIGS. 11 and 12.

The shape pad SP may include a top surface US, which protrudes upwardly toward the first jig UJ, sides, which surround the top surface US, and an incision pattern C, which is inwardly recessed from one of the sides of the shape pad SP and extends toward the first jig UJ.

The top surface US of the shape pad SP may have a convex shape. In other words, the top surface US of the shape pad SP may have an upwardly convex parabolic shape. That is, the top surface US of the shape pad SP may include an inclined surface whose height decreases from the center to the ends of the top surface US of the shape pad SP.

The planar shape of the shape pad SP, i.e., from a top view, may be rectangular except for the incision pattern C. Accordingly, the sides of the shape pad SP may include long sides LS, which have a relatively long length, and short sides SS, which have a relatively short length. More specifically, the shape pad SP may have two short sides SS, which are opposite to each other, and two long sides LS, which connect the two short sides SS. That is, the shape pad SP may have first and second short sides SS, which are opposite to each other, and first and second long sides SS, which are opposite to each other.

The shape pad SP may include the incision pattern C, which is inwardly recessed from one of the sides of the shape pad SP. For example, the incision pattern C may be disposed on one of the short sides SS of the shape pad SP, e.g., the first short side SS. The incision pattern C may be in the shape of a groove extending in one direction. For example, the direction in which the incision pattern C extends may be a positive z-axis direction of FIG. 1, i.e., a direction from the shape pad SP to the first jig UJ. In other words, the incision pattern C may extend in a direction from the top to the bottom of the first short side SS.

For example, the incision pattern C may penetrate a part of the top surface of the shape pad SP. Accordingly, the planar shape of the shape pad SP may be as illustrated in FIG. 3.

For example, the incision pattern C may be disposed at the center of the first short side SS to correspond, e.g., overlap, with the location of a driver circuit IC that will be described later, but the present disclosure is not limited thereto. That is, in another example, the incision pattern C may be located off the center of the first short side SS, in which case, the driver circuit IC may be disposed at a location corresponding to the location of the incision pattern C.

The outer circumference of the incision pattern C at the top surface of the shape pad SP may be curved. That is, as illustrated in FIG. 3, the outer circumference of the incision pattern C at the top surface of the shape pad SP may form a part of an arc, but embodiments are not limited thereto. Alternatively, the outer circumference of the incision pattern C at the top surface of the shape pad SP may be at least partially curved. In other words, the outer circumference of the incision pattern C at the top surface of the shape pad SP may include one or more curved lines and one or more straight lines.

Referring back to FIG. 1, since the outer circumference of the incision pattern C at the top surface of the shape pad SP includes a curved line, the incision pattern C may have a curved side. That is, the incision pattern C may have at least a partially curved side to correspond with the outer circumferential shape of the incision pattern C. In a case in which the outer circumference of the incision pattern C includes one or more straight lines, the incision pattern C may have one or more flat sides.

Panel supports PS may be disposed on both sides of the second jig LJ. The panel supports PS may be disposed to face the long sides LS of the shape pad SP. In other words, the panel supports PS may be disposed adjacent to the long sides LS of the shape pad SP.

The panel supports PS may support both sides of a panel PA. For example, the panel supports PS may be movable in a positive X-axis direction or a negative X-axis direction. That is, the panel supports PS may move close to, or away from, each other. As will be described later in detail, the panel PA may be bent in an arch shape in response to the panel supports PS moving close to each other while supporting both sides of the panel PA.

A dam DAM may be disposed adjacent to the first short side SS of the shape pad SP. The dam DAM may be in the shape of a bar extending in a longitudinal direction thereof. For example, the longitudinal direction of the dam DAM may be an x-axis direction of FIG. 1.

For example, the dam DAM may be placed in contact with the first short side SS of the shape pad SP, but the present disclosure is not limited thereto. In another example, the dam DAM may be spaced apart from the first short side SS of the shape pad SP, even in which case, in response to pressure being applied to the shape pad SP and the shape pad SP being expanded in a horizontal direction, the dam DAM may be placed in contact with the shape pad SP. The expansion of the shape pad SP in the horizontal direction will be described later with reference to FIGS. 11 and 12.

For example, two dams DAM may be disposed to correspond with the two short sides SS. However, the present disclosure is not limited to this example. That is, in another example, only one dam DAM may be provided to correspond with one of the short sides SS.

For example, the dam DAM may be lower in height than the shape pad SP. Accordingly, in response to pressure being applied to the shape pad SP, at least a part of the shape pad SP may be disposed to pass over the dam DAM or may be located above the dam DAM.

The dam DAM may limit the expansion of the shape pad SP in the horizontal direction. That is, the dam DAM may limit the expansion of the shape pad SP in the horizontal direction and may thus guide the shape pad SP to apply pressure in a vertical direction.

The panel PA may be disposed on the second jig LJ. For example, the panel PA may be a display panel or a touch screen panel (TSP). In another example, the panel PA may be a touch unit. However, the present disclosure is not limited to these exemplary embodiments, and the panel PA may be interpreted, e.g., as a plate-shaped member.

An adhesive layer AD may be disposed on the panel PA. The adhesive layer AD may be interposed between the window W and the panel PA and may bond the window W and the panel PA together.

For example, the adhesive layer AD may include a photocurable resin or a thermosetting resin having high transmissivity and adhesiveness. For example, the adhesive layer AD may be formed by applying a resin, e.g., an acrylic resin, and applying ultraviolet (UV) light to cure the resin. In another example, the adhesive layer AD may include an optically clear adhesive (OCA).

The adhesive layer AD is illustrated as completely covering the panel PA, but the present disclosure is not limited thereto. Alternatively, the adhesive layer AD may at least partially cover the panel PA.

For convenience, an example in which the adhesive layer AD is formed on the panel PA will hereinafter be described, but the present disclosure is not limited to this example. That is, in another example, the adhesive layer AD may be formed below the window W.

Referring to FIG. 4, the panel PA may include a display area DA and a non-display area NDA, which is disposed on the outside of the display area DA. The display area DA is an area in which an image is displayed, and the non-display area NDA is an area in which various signal lines for displaying an image in the display area DA are disposed.

The driver circuit IC, which provides signals for driving the display area DA, may be disposed in the non-display area NDA. That is, for example, the panel PA may be a chip-on-panel (COP)-type panel having the driver circuit IC directly mounted thereon.

The driver circuit IC of the panel PA may be vulnerable to pressure and may be damaged if a certain level of pressure is applied thereto. Also, as a display device becomes smaller in size, a first distance d1 between the display area DA and the driver circuit IC decreases, and the possibility of the driver circuit IC being damaged increases.

Therefore, according to embodiments, when the shape pad SP includes the incision pattern C in a region overlapping the driver circuit IC, an area corresponding to the incision pattern C in the panel PA, i.e., an area including the driver circuit IC, may receive no pressure at all or a relatively low pressure during a lamination process. That is, in a case in which the driver circuit IC is disposed in a location corresponding to the incision pattern C, the pressure applied to the driver circuit IC may be reduced, and as a result, damage to the driver circuit IC may be prevented.

Referring to FIGS. 5 and 6, the window W may include the flat surface FS and the curved surfaces CS, which are disposed on both, e.g., opposite, sides of the flat surface FS. Boundaries may be formed, e.g., defined, between the flat surface FS and the curved surfaces CS. In other words, the flat surface FS and the curved surfaces CS may be defined by, e.g., imaginary, boundaries therebetween.

For convenience, horizontal boundaries BL_H and vertical boundaries BL_V may be defined as illustrated in FIGS. 5 and 6. The horizontal boundaries BL_H may be defined as boundaries that separate the curved surfaces CS and the flat surface FS at the top surface of the window W. The horizontal boundaries BL_H may be provided on an XY plane (see FIG. 5). The vertical boundaries BL_V may be defined as boundaries that separate the curved surfaces CS and the flat surface FS at the bottom surface of the window W. The vertical boundaries BL_V may extend in a vertical direction, i.e., the Z-axis direction, and may be provided on a YZ plane (see FIG. 6).

The operation of a laminating apparatus according to an exemplary embodiment of the present disclosure will hereinafter be described with reference to FIGS. 7 through 10. FIGS. 7 through 10 are cross-sectional views of stages during operation of the laminating apparatus of FIG. 1.

An initial state will hereinafter be described with reference to FIG. 7. The term "initial state", as used herein, denotes a state in which the panel PA is safely received on the panel supports PS, the window W and the adhesive layer AD are spaced apart from each other, and the panel PA and the shape pad SP are spaced apart from each other.

Figure 7:
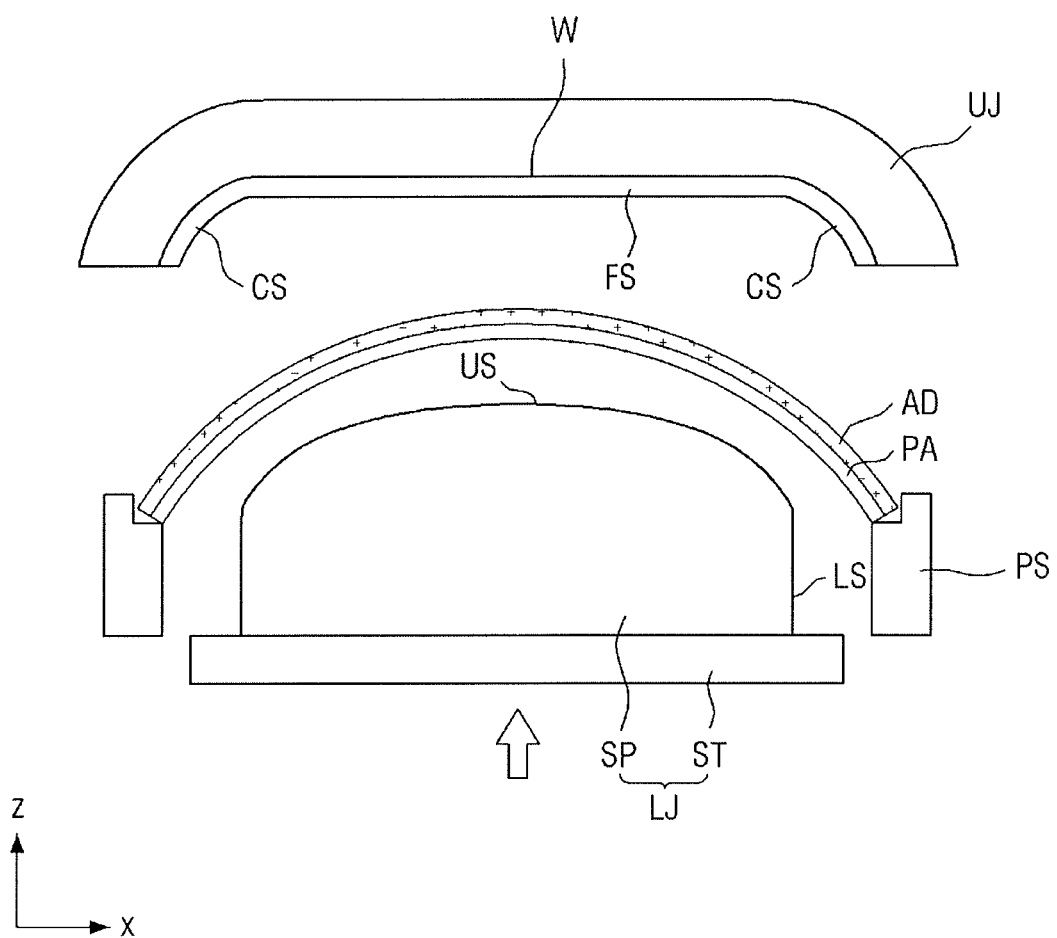
FIGS. 7 to 10 illustrate cross-sectional views of stages during operation of a laminating apparatus according to an exemplary embodiment.

Referring to FIG. 7, in the initial state, the panel supports PS may support both ends of the panel PA and may move close to each other along the X-axis. As the panel supports PS move close to each other, the panel PA may be bent into an arch shape. In other words, the panel PA may be bent into a convex parabolic shape, e.g., extending toward the window W.

A lamination process may be performed by allowing the first and second jigs UJ and LJ to move close to each other along the Z-axis. That is, the first jig UJ may be lowered, the second jig LJ may be lifted, or the first and second jigs UJ and LJ may both be lowered or lifted so as for the first and second jigs UJ and LJ to move close to each other. For convenience, an example in which the first jig UJ is fixed and the second jig LJ is lifted will hereinafter be described.

Figure 8:
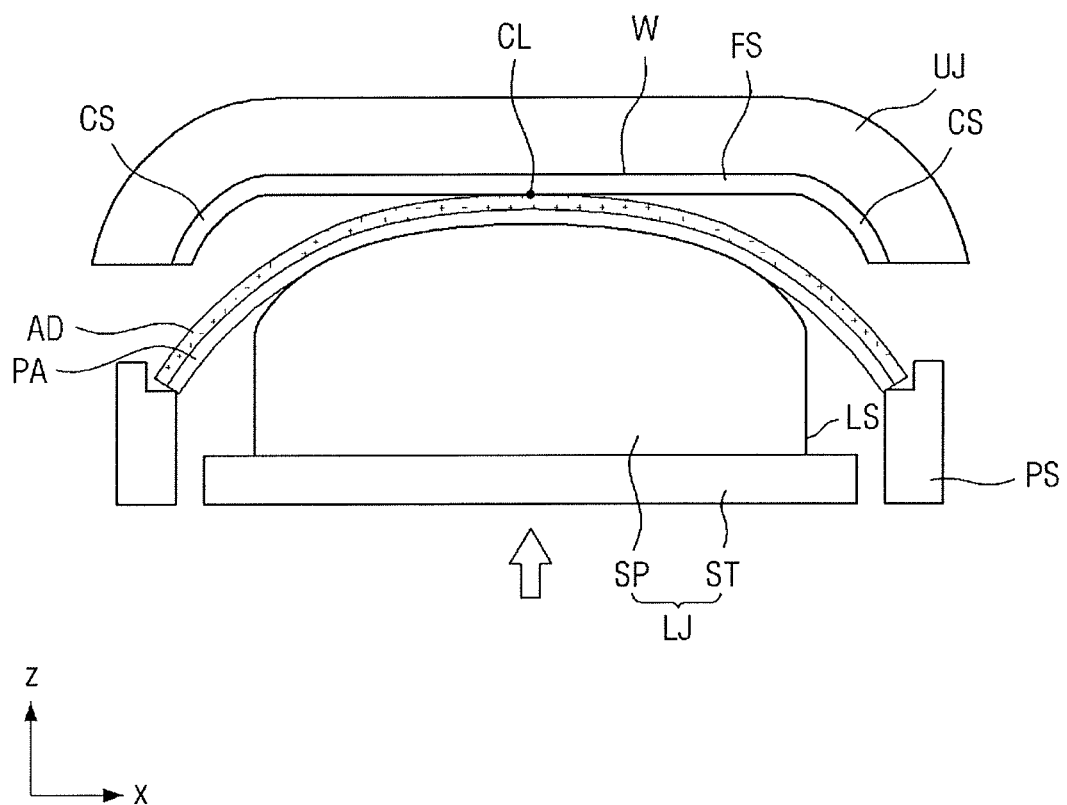

Referring to FIG. 8, as the second jig LJ is lifted, the bottom surface of the panel PA and the shape pad SP are placed in contact with each other. As mentioned above, the shape pad SP may have elasticity and may be deformed by pressure applied thereto upon being placed in contact with the panel PA. That is, as the second jig LJ is lifted, the bottom surface of the panel PA and the shape pad SP may be placed in contact with each other.

As the second jig LJ is lifted, the adhesive layer AD, which is disposed on the panel PA, and the window W are initially placed in contact with each other at their middle parts. In this case, the flat surface FS of the window W and the adhesive layer AD of the panel PA, which has a parabolic shape, may be placed in line contact with each other in their middle parts. In other words, a contact line CL may be formed at the window W and the adhesive layer AD.

Figure 9:
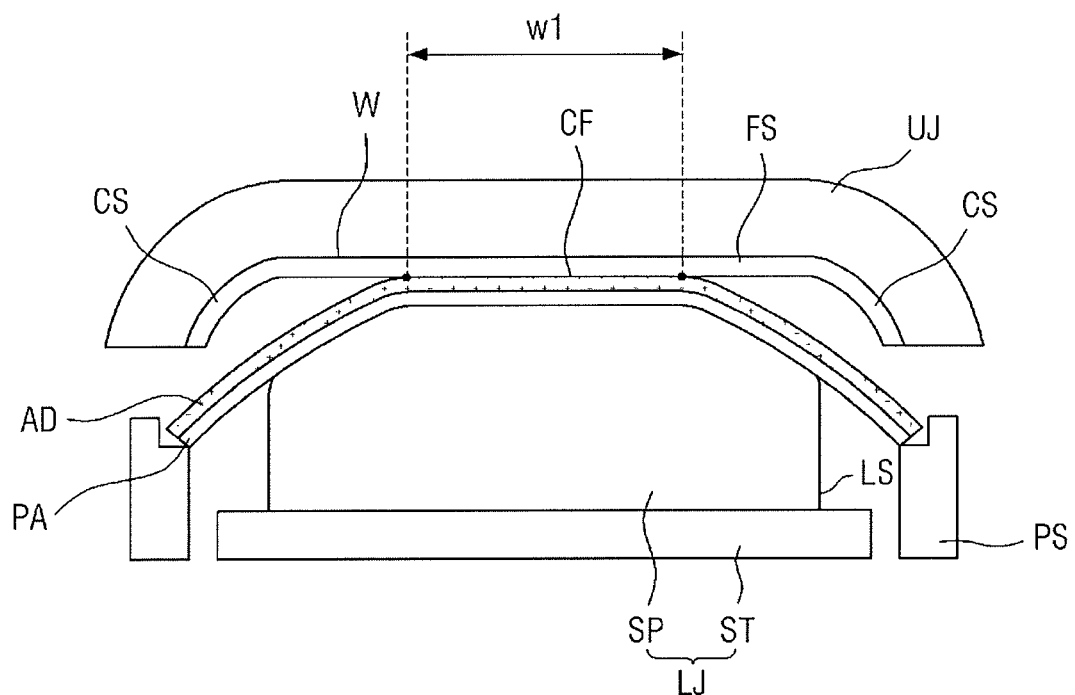

Thereafter, referring to FIG. 9, as the second jig LJ continues to be lifted, the area of contact between the window W and the adhesive layer AD may widen gradually from the contact line CL to both sides of the contact line CL. In other words, the window W and the adhesive layer AD may be placed in surface contact with each other. That is, a contact surface CF may be formed where the window W and the adhesive layer AD contact each other. The window W and the panel PA may be bonded gradually from their centers to their edges.

In this case, the width of the contact surface CF may be the same as a first width w1. The first width w1 may be smaller than the distance between the vertical boundaries BL_V.

An air layer may be prevented from being inserted between the panel PA and the window W, only if the panel PA and the window W are bonded gradually from their centers to their edges. As described above, in a case in which the panel PA is pressurized using the shape pad SP, which has the top surface US that is upwardly convex, the window W and the panel PA may be sequentially bonded together, and as a result, an air layer may be prevented from being inserted between the panel PA and the window W.

Figure 10:
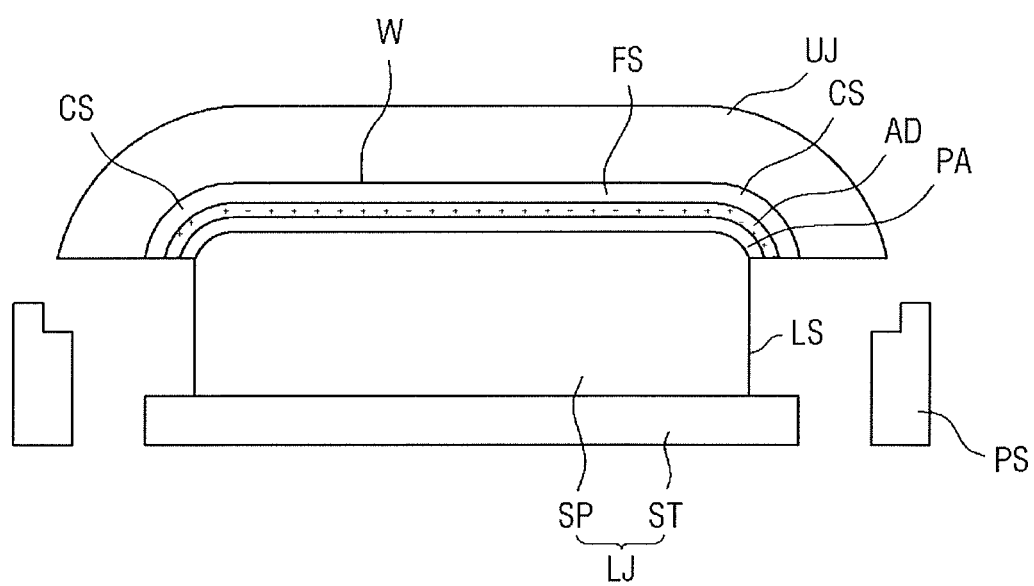

Thereafter, referring to FIG. 10, the second jig LJ continues to be lifted upward, so a top surface of the shape pad SP flattens against the flat surface of the first jig UJ, and the contact surface CF continues to widen, e.g., increase. The lamination process is complete when the window W and the panel PA are completely bonded together. In this case, the window W, the panel PA, and the top surface US of the shape pad SP may completely overlap with one another. Also, the top surface US of the shape pad SP may include a flat portion and curved portions to conform to the shape of the window W or the panel PA.

Figure 11:
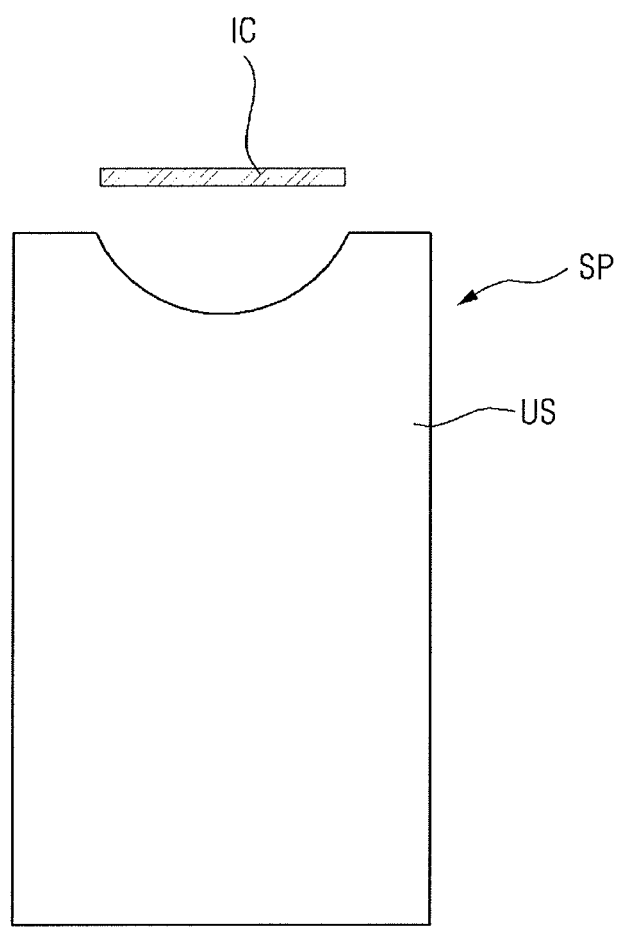
FIG. 11 illustrates a partial layout view of the laminating apparatus according to the exemplary embodiment of FIG. 1.
Figure 12:
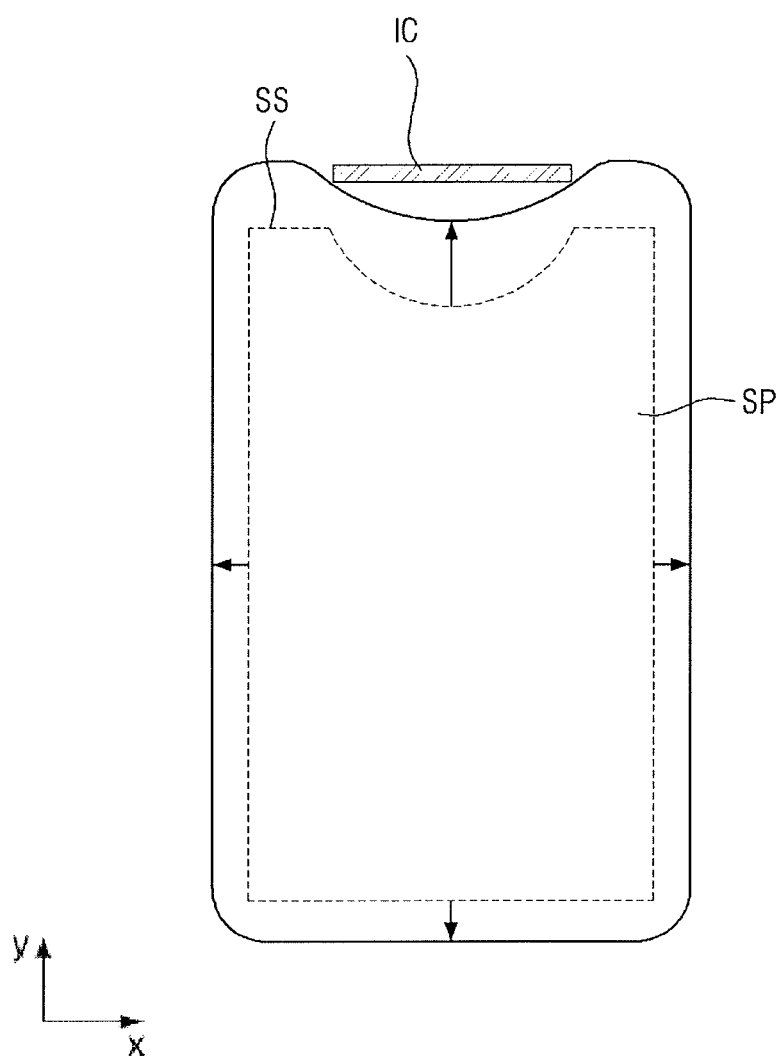
FIG. 12 illustrates a partial layout view of the laminating apparatus according to the exemplary embodiment of FIG. 1.

The expansion of the shape pad SP in the horizontal direction will hereinafter be described with reference to FIGS. 11 and 12. FIGS. 11 and 12 are partial layout views of the laminating apparatus according to the exemplary embodiment of FIG. 1. More specifically, FIG. 11 illustrates the relationship between the shape pad SP and the driver circuit IC in the initial state (see FIG. 7), and FIG. 12 illustrates the relationship between the shape pad SP and the driver circuit IC in a "process completed" state (see FIG. 10).

As mentioned above, the driver circuit IC may be disposed adjacent to the incision pattern C. As illustrated in FIG. 11, in the initial state, the driver circuit IC and the incision pattern C may not overlap with each other. In response to pressure being applied to the shape pad SP, e.g., as the shape pad SP flattens against the flat surface of the first jig UJ, the shape pad SP may be expanded in the horizontal direction, as illustrated in FIG. 12.

As the shape pad SP is expanded in the horizontal direction, the distance between the shape pad SP and the driver circuit IC may decrease. That is, a part of the shape pad SP where the incision pattern C is formed and the driver circuit IC may become close to each other, even in which case, the shape pad SP and the incision pattern C may not overlap with each other.

That is, in response to pressure being applied to the shape pad SP, the short side SS may expand in the X-axis direction, so edges defining the incision pattern C, i.e., where the incision pattern C is not formed, may be expanded. For example, in the "process completed" state (FIG. 12), edges defining the incision pattern C may expand in the X-axis direction, so a width of the incision pattern C in the X-axis direction increases, thereby allowing the driver circuit IC to be located, e.g., fit, between ends of the short side SS where the incision pattern C is not formed.

That is, even in a case in which the incision pattern C is provided, pressure may need to be provided to stably bond the corners of the window W or the panel PA. That is, even in a case in which the incision pattern C is formed to correspond with the driver circuit IC, the short side SS where the incision pattern C is not formed may be sufficiently expanded in the horizontal direction and may thus provide necessary pressure to the window W or the panel PA.

FIG. 12 illustrates the shape pad SP and the driver circuit IC as not overlapping with each other in the "process completed" state, but the present disclosure is not limited thereto. That is, alternatively, the shape pad SP may at least partially overlap with the driver circuit IC. For example, both ends of the driver circuit IC or a part of a long side of the driver circuit IC may partially overlap with the shape pad SP.

Figure 13:
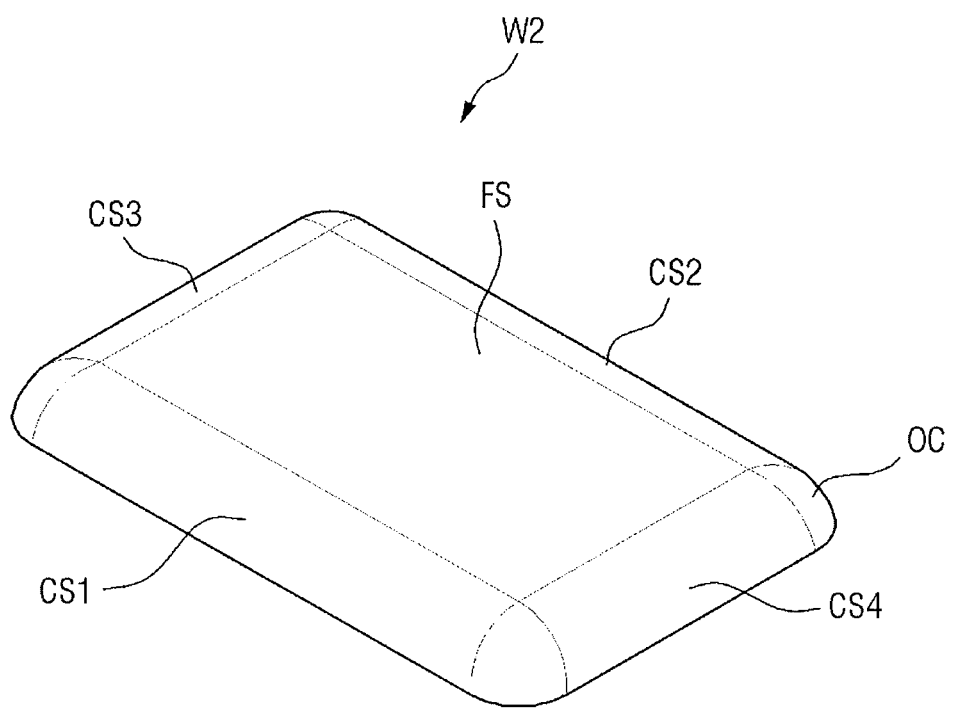
FIG. 13 illustrates a partial perspective view of the laminating apparatus according to the exemplary embodiment of FIG. 1.

A laminating apparatus according to other exemplary embodiments of the present disclosure will hereinafter be described with reference to FIG. 13. FIG. 13 is a partial perspective view of a laminating apparatus according to an exemplary embodiment of the present disclosure.

Referring to FIG. 13, the laminating apparatus according to the present exemplary embodiment differs from the laminating apparatus according to the exemplary embodiment of FIG. 1 in that a window W2 includes four curved surfaces. For example, the window W2 may include four curved surfaces.

Two curved surfaces CS1 and CS2, which are disposed along the long sides of the window W2, may be substantially identical to the curved surfaces CS of the window W of FIG. 1. In the present exemplary embodiment, unlike in the exemplary embodiment of FIG. 1, curved surfaces CS3 and CS4 may be additionally formed along the short sides of the window W2.

For example, the window W2 may further include connecting curved surfaces OC, which connect the curved surfaces disposed along the long sides of the window W2 and the curved surfaces disposed along the short sides of the window W2. In other words, the connecting curved surfaces OC may be placed in contact with one of the curved surfaces CS1 and CS2 at one side thereof and may be placed in contact with one of the curved surfaces CS3 and CS4 at the other side thereof.

For example, the window W2 may include four connecting curved surfaces OC, but the present disclosure is not limited thereto. That is, the window W2 may include less than four or more than four connecting curved surfaces OC.

Figure 14:
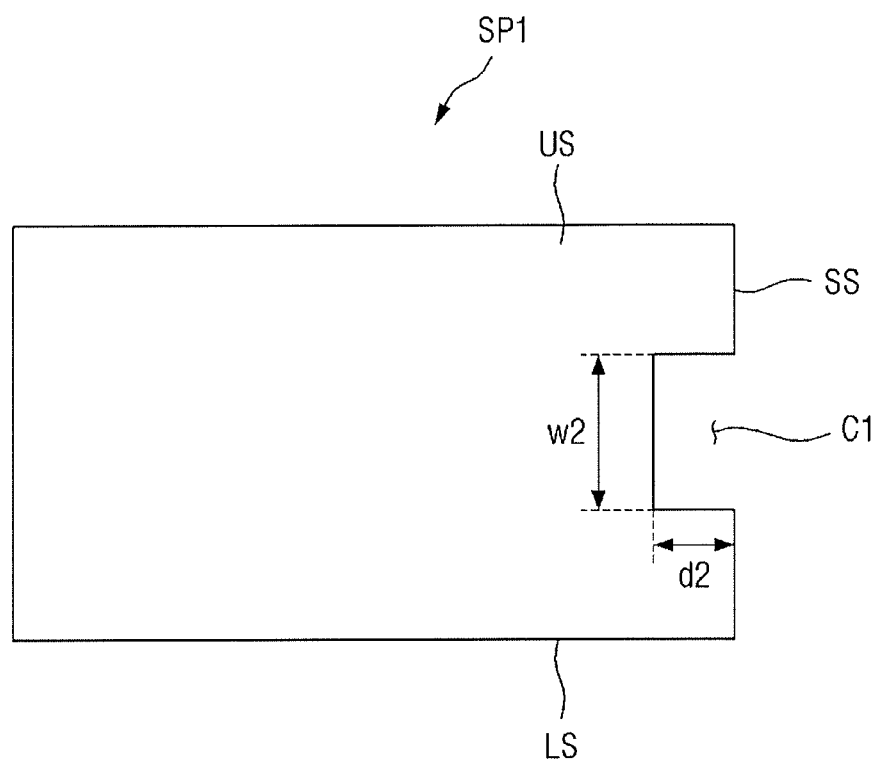
FIG. 14 illustrates a partial plan view of the laminating apparatus according to the exemplary embodiment of FIG. 1.

FIG. 14 is a partial plan view of a laminating apparatus according to an exemplary embodiment of the present disclosure.

Referring to FIG. 14, the laminating apparatus according to the present exemplary embodiment differs from the laminating apparatus according to the exemplary embodiment of FIG. 3 in that the planar shape of an incision pattern C1 of a shape pad SP1 is rectangular. For example, the outer circumferential shape of the incision pattern C1 of the shape pad SP1 may be rectangular. In this example, a width w2 and a depth d2 of the incision pattern C1 may be set according to the location and the width of a driver circuit IC disposed on a panel PA.

Figure 15:
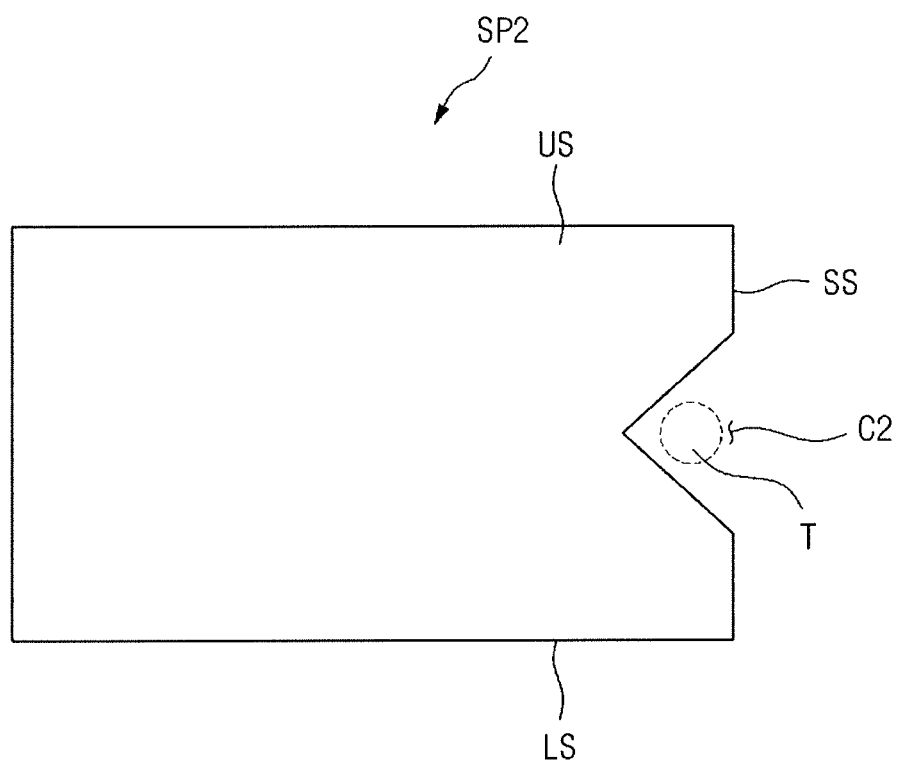
FIG. 15 illustrates a partial plan view of a laminating apparatus according to another exemplary embodiment of the present disclosure.

FIG. 15 is a partial plan view of a laminating apparatus according to another exemplary embodiment of the present disclosure.

Referring to FIG. 15, the laminating apparatus according to the present exemplary embodiment differs from the laminating apparatus according to the exemplary embodiment of FIG. 3 in that the planar shape of an incision pattern C2 of a shape pad SP2 is triangular. For example, the outer circumferential shape of the incision pattern C2 of the shape pad SP2 may be triangular. In a case in which the outer circumferential shape of the incision pattern C2 is triangular, the pressure applied to a panel PA by the incision pattern C2 may be relatively low at a central part T of the incision pattern C2 and may gradually increase from the central part T to both sides of the incision pattern C2.

Figure 16:
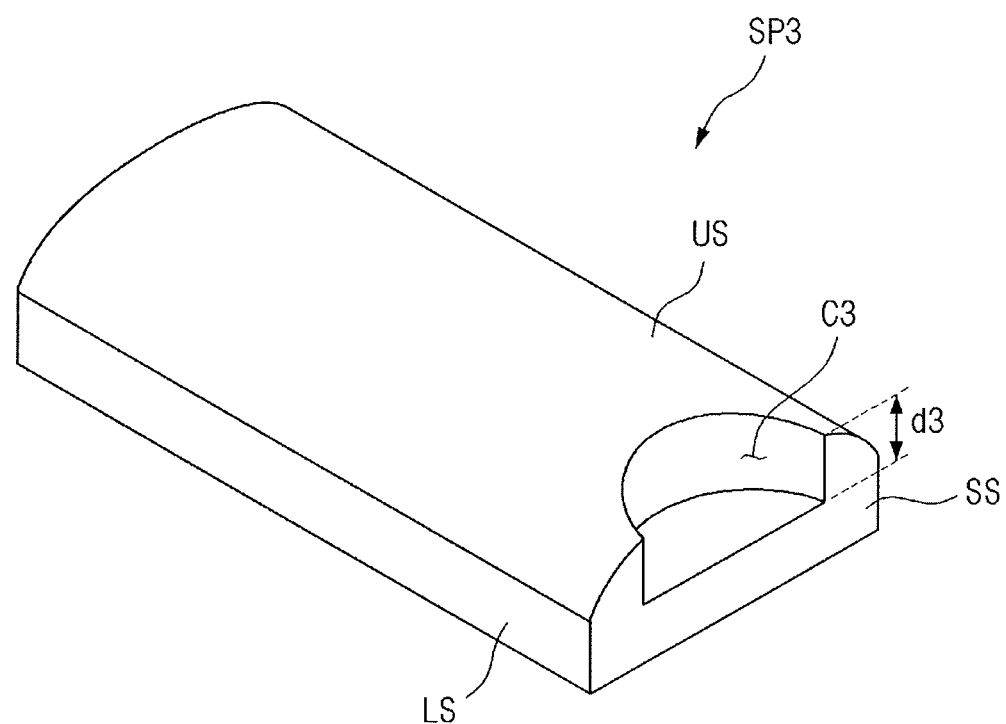
FIG. 16 illustrates a partial perspective view of a laminating apparatus according to another exemplary embodiment of the present disclosure.

FIG. 16 is a partial perspective view of a laminating apparatus according to another exemplary embodiment of the present disclosure.

Referring to FIG. 16, the laminating apparatus according to the present exemplary embodiment differs from the laminating apparatus according to the exemplary embodiment of FIG. 1 in that an incision pattern C3 of a shape pad SP3 penetrates a short side SS of the shape pad SP3 only partially. For example, the incision pattern C3 may only partially penetrate the short side SS of the shape pad SP3. In this example, a stepped portion may be formed on the short side SS by the incision pattern C3.

A higher pressure may be provided to a panel PA when a stepped portion is formed on the short side SS than when no stepped portion is formed on the short side SS. A depth d3 of the incision pattern C3 may be set according to the pressure for bonding the panel PA and a window W and the durability of a driver circuit IC.

Figure 17:
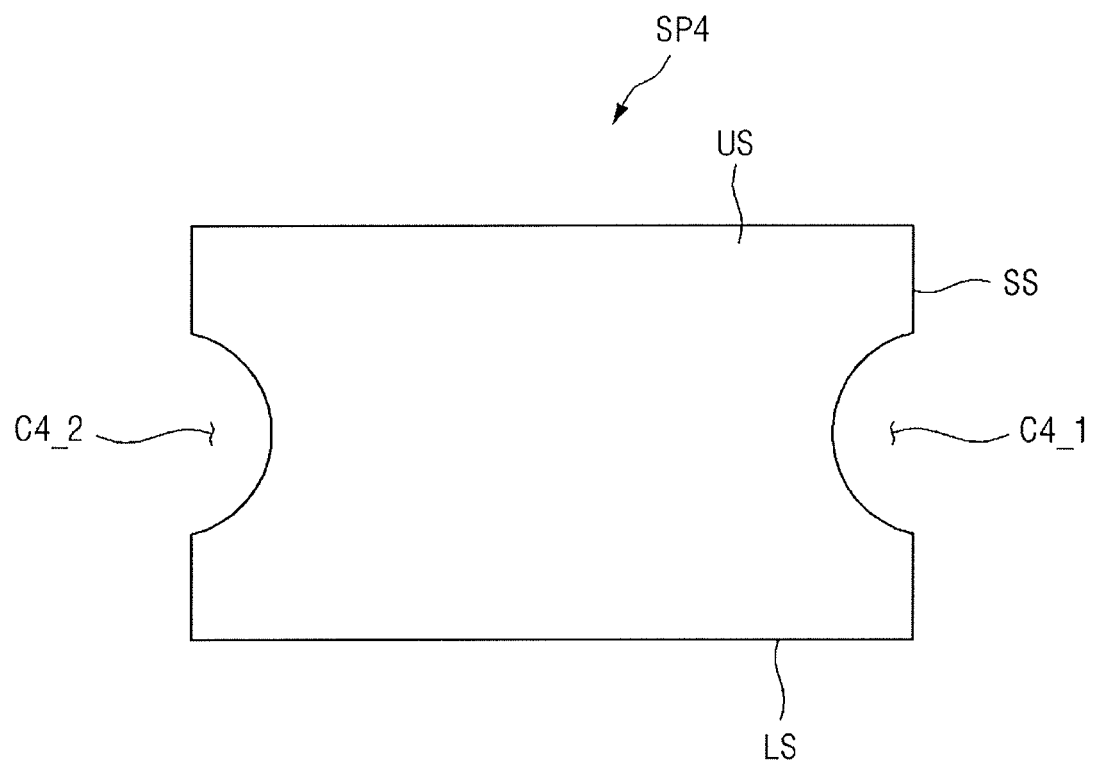
FIG. 17 illustrates a partial plan view of a laminating apparatus according to an exemplary embodiment of the present disclosure.

FIG. 17 is a partial plan view of a laminating apparatus according to an exemplary embodiment of the present disclosure.

Referring to FIG. 17, the laminating apparatus according to the present exemplary embodiment differs from the laminating apparatus according to the exemplary embodiment of FIG. 3 in that two incision patterns, i.e., first and second incision patterns C4_1 and C4_2, are formed on two short sides SS, respectively, of a shape pad SP4. For example, a plurality of incision patterns may be formed. In a case in which the shape pad SP4 has two short sides, the first and second incision patterns C4_1 and C4_2 may be formed on the shape pad SP4.

In a case in which the first and second incision patterns C4_1 and C4_2 are formed on the shape pad SP4, two driver circuits IC may be formed on both sides of a panel PA to correspond with the locations of the first and second incision patterns C4_1 and C4_2, but the present disclosure is not limited thereto. That is, the first and second incision patterns C4_1 and C4_2 may be disposed to correspond with parts of the panel PA, other than the driver circuits IC, that are vulnerable to pressure.

Figure 18:
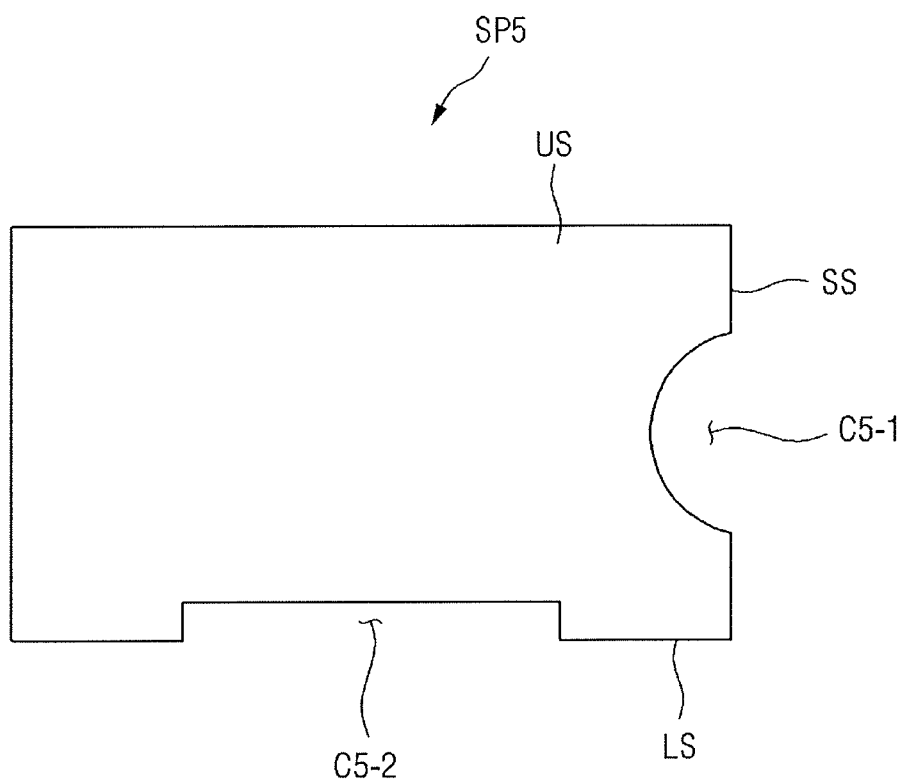
FIG. 18 illustrates a partial plan view of a laminating apparatus according to an exemplary embodiment of the present disclosure.

FIG. 18 is a partial plan view of a laminating apparatus according to an exemplary embodiment of the present disclosure.

Referring to FIG. 18, the laminating apparatus according to the present exemplary embodiment differs from the laminating apparatus according to the exemplary embodiment of FIG. 3 in that a shape pad SP5 includes first and second incision patterns C5_1 and C5_2, which are formed on a short side SS and a long side LS, respectively, of the shape pad SP5. For example, an incision pattern may be formed on the long side LS of the shape pad SP5. FIG. 18 illustrates the first and second incision patterns C5_1 and C5_2 as being formed on the short side SS and the long side LS, respectively, of the shape pad SP5, but the present disclosure is not limited thereto. That is, the first and second incision patterns C5_1 and C5_2 may be formed only on the long side LS of the shape pad SP5.

In a case in which the first and second incision patterns C5_1 and C5_2 are formed on the shape pad SP5, two driver circuits IC may be formed on a long side and a short side of a panel PA to correspond with the locations of the first and second incision patterns C5_1 and C5_2, but the present disclosure is not limited thereto. That is, the first and second incision patterns C5_1 and C5_2 may be disposed to correspond with parts of the panel PA, other than the driver circuits IC, that are vulnerable to pressure.

Figure 19:
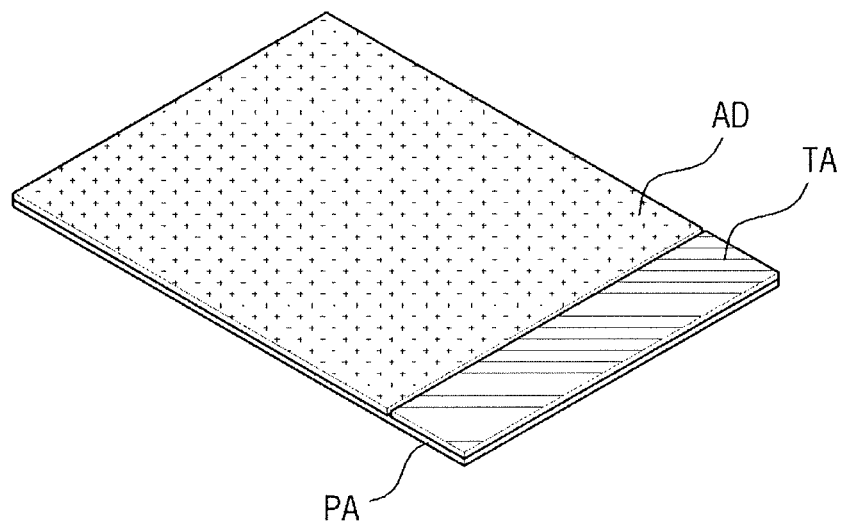
FIG. 19 illustrates a partial perspective view of a laminating apparatus according to an exemplary embodiment of the present disclosure.

FIG. 19 is a partial perspective view of a laminating apparatus according to an exemplary embodiment of the present disclosure.

Referring to FIG. 19, the laminating apparatus according to the present disclosure differs from the laminating apparatus according to the exemplary embodiment of FIG. 1 in that an adhesive layer AD1 and an adhesive tape TA are disposed on a panel PA. For example, the adhesive layer AD1 may be a pressure sensitive adhesive (PSA). In this example, an adhesive force for stably bonding the panel PA and a window W can be formed in the adhesive layer AD1 only when sufficient pressure is applied to the adhesive layer AD1.

However, since sufficient pressure cannot be provided in an area where an incision pattern C is formed, the adhesive force of the adhesive layer AD1 may be weakened. For this, the adhesive tape TA, instead of the adhesive layer AD1, may be provided on a side of the panel PA. The adhesive tape TA may be disposed to overlap with a driver circuit IC. The adhesive tape TA may stably bond a window W and the panel W by using a relatively low pressure.

A method of fabricating a display device according to an exemplary embodiment of the present disclosure will hereinafter be described. Throughout the present disclosure, like reference numerals refer to like elements, and thus, descriptions thereof will be omitted, or at least simplified.

The method of fabricating a display device includes preparing a first jig UJ, which fixes a window W, a second jig LJ, which includes a shape pad SP that faces the first jig UJ, and a panel PA, which is disposed on the second jig LJ. Then, the window W and the panel PA are gradually bonded by applying pressure to the panel PA with the shape pad SP. The method of fabricating a display device may be performed by any one of the laminating apparatuses according to the aforementioned exemplary embodiments of the present disclosure, but the present disclosure is not limited thereto.

First, the step of preparing the first jig UJ, which fixes the window W, the second jig LJ, which includes the shape pad SP that faces the first jig UJ, and the panel PA, which is disposed on the second jig LJ, is performed. The first jig UJ, the second jig LJ, the panel PA, and the shape pad SP are the same as their respective counterparts of any one of the laminating apparatuses according to the aforementioned exemplary embodiments of the present disclosure, and thus, detailed descriptions thereof will be omitted (see FIGS. 1 and 2).

Once the step of preparing the first jig UJ, the second jig LJ, and the panel PA is complete, the initial state described above with reference to FIG. 7 may be established. In the initial state, the panel PA may be bent into an arch shape by inwardly pushing both ends of the panel PA with panel supports PS.

Thereafter, the step of gradually bonding the window W and the panel PA by applying pressure to the panel PA with the shape pad SP may be performed. For example, the shape pad SP may be lifted in a positive Z-axis direction to apply pressure to the panel PA. In response to pressure being applied to the panel PA, the window W may be placed in line contact with an adhesive layer AD, which is disposed on the panel PA. That is, the contact line CL along which the window W and the adhesive layer AD are placed in contact with each other may be formed (see FIG. 8).

As the shape pad SP continues to rise, the contact line CL may be expanded into the contact surface CF (see FIG. 9). Thereafter, the step of gradually bonding the window W and the panel PA by applying pressure to the panel PA with the shape pad SP with the ends of the window W and the ends of the panel PA spaced apart from each other may be performed. That is, as the shape pad SP continues to apply pressure to the panel PA, the window W and the panel PA may be gradually bonded together.

The shape pad SP may continue to apply pressure to the panel PA Until the window W and the panel PA are completely bonded together. Once the window W and the panel PA are completely bonded together (i.e., in the "process completed" state), the top surface of the shape pad SP may include a flat portion and curved portions to correspond with the shape of the window W or the panel PA.

As mentioned above, a driver circuit IC may be disposed on a side of the panel PA. The method of fabricating a display device may further include applying, by the shape pad SP, a relatively low pressure to an area where the driver circuit IC is disposed and a relatively high pressure to an area around the driver circuit IC (see FIGS. 11 and 12). The difference in the pressure applied by the shape pad SP may be caused by the shape of an incision pattern C.

By way of summation and review, exemplary embodiments provide a laminating apparatus capable of providing a uniform bonding between a window and a panel, as well as preventing a driver circuit on the panel from being damaged or broken. Exemplary embodiments also provide a manufacturing method of a display device with a uniform bonding between a window and a panel, as well as an undamaged driver circuit. That is, according to the exemplary embodiments, a uniform bonding can be provided between the panel and a window having curved surfaces. In addition, a driver circuit formed on the panel can be prevented from being damaged or broken by pressure applied during the bonding of the window and the panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of fabricating a display device, the method comprising:
   preparing a first jig, which fixes a window, a second jig, which includes a shape pad that faces the first jig, and a panel, which is disposed on the second jig; and
   gradually bonding the window and the panel by applying pressure to the panel with the shape pad, wherein
   the shape pad includes a top surface, which protrudes toward the first jig, a bottom surface, sides, which surround the top surface and the bottom surface, and at least one incision pattern, which is inwardly recessed from at least one of the sides of the shape pad and extends toward the first jig to form a penetration structure which penetrates from the top surface of the shape pad to the bottom surface of the shape pad.

2. The method as claimed in claim 1, wherein a driver circuit is disposed on an area of a side of the panel, and the method further includes applying, by the shape pad:
   a first pressure to the area of the side of the panel on which the driver circuit is disposed, and
   a second pressure to another area of the panel, in which a magnitude of the first pressure is less than a magnitude of the second pressure.

3. The method as claimed in claim 1, wherein:
   the sides of the shape pad include long sides and short sides, and
   the at least one incision pattern is formed on one of the short sides.

4. The method as claimed in claim 3, wherein:
   the short sides include first and second short sides forming opposite portions of the shape pad,
   the at least one incision pattern includes a first incision pattern and a second incision pattern, and
   the first incision pattern is formed on the first short side and the second incision pattern is formed on the second short side.

5. The method as claimed in claim 1, wherein the at least one incision pattern extends to connect a top and a bottom of the short side where it is formed.

6. The method as claimed in claim 1, wherein the second jig further includes:
   a stage, on which the shape pad is disposed, and
   a dam, which is disposed adjacent to the at least one of the sides of the shape pad.

7. The method as claimed in claim 1, wherein a planar shape of the at least one incision pattern is at least partially curved.

8. The method as claimed in claim 1, wherein a planar shape of the at least one incision pattern is rectangular.

9. The method as claimed in claim 1, wherein a planar shape of the at least one incision pattern is triangular.

10. The method as claimed in claim 1, wherein the window includes a flat surface and curved surfaces, which are disposed on opposite sides of the flat surface.

11. The method as claimed in claim 1, wherein:
    the panel comprises ends, and
    the second jig further comprises panel supports that bend the panel by inwardly pushing both of the ends of the panel.

12. The method as claimed in claim 2, wherein the incision pattern corresponds to the area of the side of the panel on which the driver circuit is disposed.

13. The method as claimed in claim 4, wherein:
    a driver circuit is disposed on each of areas of sides of the panel respectively corresponding to the first and second incision patterns, and
    the method further includes applying, by the shape pad:
    a first pressure to each of the areas of the sides of the panel on which the driver circuit is disposed, and
    a second pressure to another area of the panel, in which a magnitude of the first pressure is less than a magnitude of the second pressure.

* * * * *